March 16, 1954  D. R. CORMANY  2,672,158
FLUID BALANCED VALVE
Filed Aug. 27, 1947  2 Sheets-Sheet 1

INVENTOR.
David R. Cormany
BY
ATTORNEY

March 16, 1954

D. R. CORMANY 2,672,158

FLUID BALANCED VALVE

Filed Aug. 27, 1947

INVENTOR.
David R. Cormany
BY
ATTORNEY

Patented Mar. 16, 1954

2,672,158

UNITED STATES PATENT OFFICE 2,672,158

FLUID BALANCED VALVE

David R. Cormany, Long Beach, Calif., assignor, by mesne assignments, to Jamieson & Gabriel, Los Angeles, Calif., a partnership Application August 27, 1947, Serial No. 770,803

4 Claims. (Cl. 137—758)

This invention relates to a valve construction and more particularly to a fluid balanced valve specially adapted for use in high pressure lines.

An object of the invention is to provide such a valve assembly comprising a manually operable, piston-type valve having means adapted in closed position for receiving the inlet fluid pressure against both its front and rear faces, with the effective surface of the forward face being substantially reduced in such position so that the pressure on its opposite face retains the seated valve in sealing registration while remaining easily and immediately shiftable at will to an open position. Such a valve remains unaffected by fluctuations of pressure in the outlet line.

A further purpose is the provision of a valve assembly of the character described containing sealing elements, exemplified by rubber O rings, which obviate the necessity of ground joint surfaces and provide a highly efficient and readily replaceable seal, especially effective in conjunction with the problem of reducing the fluid contact surface of one end of the cylindrical piston above referred to.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 1:
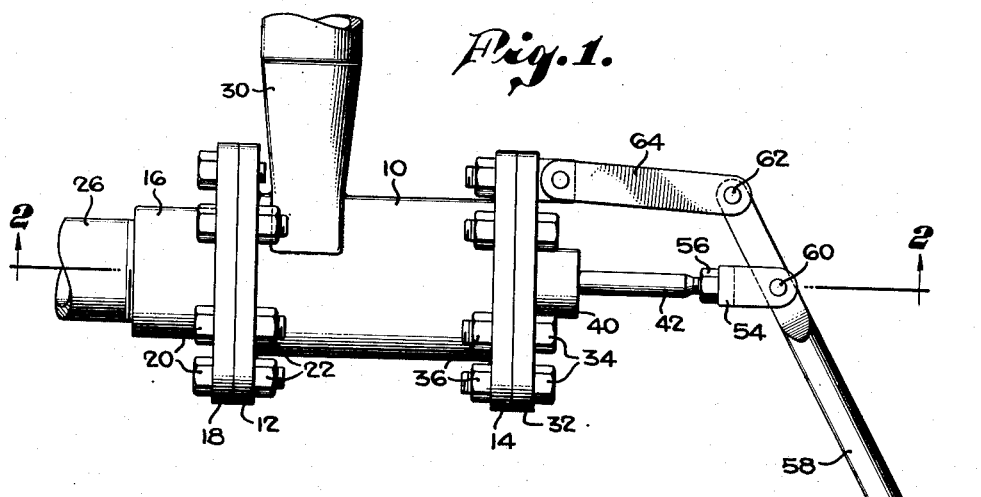
Figure 1 is a side elevational view of one form of my valve assembly.

As illustrated, there is provided a tubular housing 10 open at both ends and having a pair of outwardly projecting flanges, 12 and 14, integrally attached to its respective ends as by welding or the like. On one end of the housing an internally threaded coupling sleeve 16 is secured by means of a coupling flange 18 attached to the juxtaposed, correspondingly shaped flange 12 by means of headed bolts 20 inserted through transversely aligned apertures about the periphery of the two flanges and secured therein by tightening nuts 22. The terminal abutment of the casing 10 against the coupling flange 18 is tightly sealed by means of an O ring or deformable annular gasket 24 substantially circular or polygonal in cross section and seated in an annular groove formed along the inner face of the flange 18. The coupling sleeve 16 is adapted for the threaded attachment thereto of an inlet line 26, the transverse sectional area of the inlet aperture being substantially less than that of the valve chamber 28 formed within the tube 10.

Somewhat axially spaced away from the inlet mouth, there is provided an outlet conduit 30 extending laterally off from the valve chamber 28. The opposite end of the housing 10 is provided with a disk shaped closure 32 secured to the adjacent housing flange 14 by means of headed bolts 34 inserted through aligned transverse apertures, peripherally disposed about the two plates as in the opposite flanges 12 and 18, the bolts being secured in place by internally threaded attachment nuts 36. Similar to the other end of the casing 10, an O ring 38 is located in an annular groove of the closure plate 32 so as to abut against the end of the casing 10 in sealing registration.

An annular boss 40 is centrally formed upon the outer face of the closure plate 32, being axially traversed by an aperture within which is slidably disposed a piston rod 42 having threadedly mounted upon its inner end a piston head or plunger 44. The plunger, which is reciprocable within the chamber 28 is of such a length as to be retractable to an open position in which its rear end will abut against the inner face of the closure plate 32 and its forward end will not obstruct the outlet aperture 30, thereby permitting unobstructed flow of fluid from the inlet line 26 through the valve chamber 28 and thence out through the lateral outlet 30. In this open position the plunger 44 seals off escape of fluid in the direction of the piston rod 42 by means of a pair of O rings or sealing gaskets 46 and 48 disposed in corresponding peripheral grooves, axially spaced apart adjacent the base of the plunger. Similar sealing gaskets 50 and 52 are mounted within grooves of the annular boss 40 so as to embrace the piston rod 42.

The outer end of the piston rod is threadedly mounted in the base of a forked connecting member 54 being secured thereon by a lock nut 56. An operating arm or lever 58 is attached by means of a transverse pivot pin 60 between the forked ends of the connection 54, the lever 58 being fulcrumed at 62 to the outer end of a link 64 which is attached at its other end adjacent an outer edge of the closure plate 32. Accordingly it will be seen that by manual movement of the lever arm 58, the plunger 44 can be shifted from one end of the chamber to the other.

Figure 2:
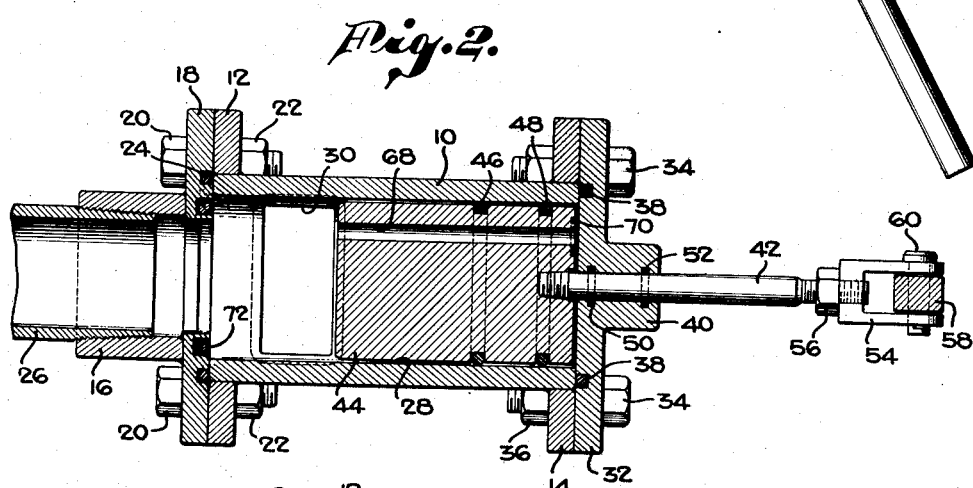
Figure 2 is a medial longitudinal sectional view therethrough, partly in elevation, taken along the line 2—2 of Figure 1 and showing the valve in open position.
Figure 3:
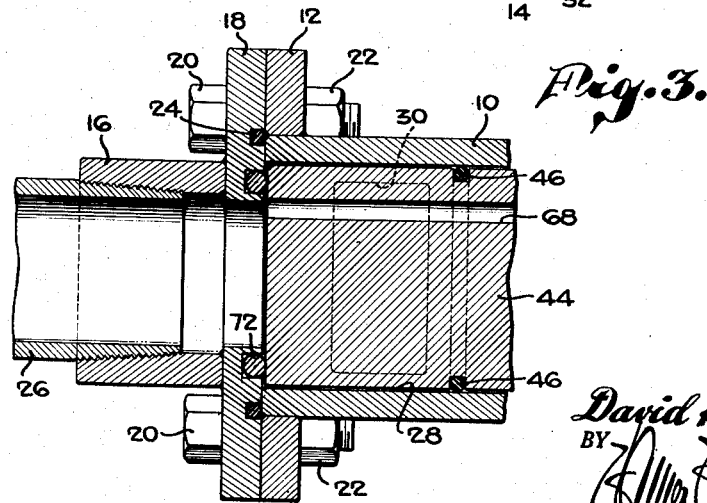
Figure 3 is an enlarged fragmentary view similar to Figure 2 but with the valve closed.

The piston is provided with a longitudinal channel 68 of comparatively small bore, an O ring 70 being located in a corresponding groove of the back face of the piston surrounding the channel so as to provide a seal against fluid escaping from this end of the channel when the piston is in retracted position. When the piston is moved from its open position (shown in Figure 2) to its opposite or closed position (shown in Figure 3) adjacent the inlet end of the chamber 28, it thereby closes the outlet 30 and fluid passing through the piston channel 68 to the rear of chamber 28 then exerts force upon to the back face of the piston 44 to hold the same in closed position. Since the area surrounded by O ring 72 adjacent the forward face of the closed piston is of smaller diameter and hence of lesser cross section plan area than that of the piston itself, the fluid pressure upon the rear surface area of the piston 44 serves as a positive force for overbalance in opposition to the pressure of the inlet stream 26. Consequently the amount of manual effort required to throw the plunger in either direction will be very small, corresponding to this amount of overbalance, so that the valve is easily operated and nicely balanced for practically instantaneous manually operated movement in either direction. In its forward position, the lead edge of the piston seats against a sealing gasket or O ring 72 disposed along the inner face of the flange 18.

Figure 4:
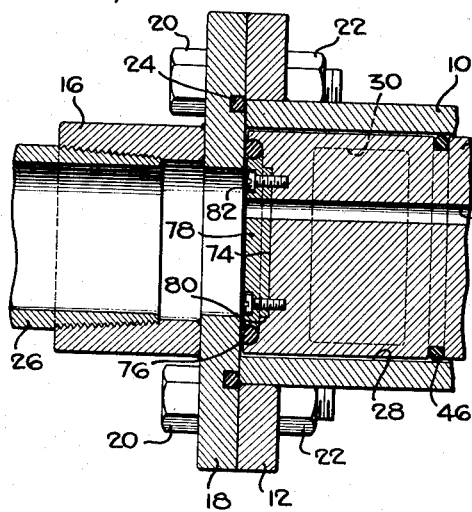
Figure 4 is a view similar to Figure 3 but showing a modified construction of the piston head.

In the modification illustrated in Figure 4, the forward face of the piston is formed with a stepped, annular recess 74. A cylindrical O ring is disposed about the outer perimeter of the recess so as normally to protrude slightly above the forward face of the piston and hence upon compression to provide a sealing registration at such point between the inner side of the aperture flange 18 and the piston head disposed immediately adjacent thereto. An engaging cap 78 is centered within the recess by means of an inner boss or neck 80 formed of reduced diameter and seated within the stepped portion of the recess, the outer periphery of the enlarged portion of the cap being provided with a concave outer surface thereabout so as to embrace and frictionally retain the gasket 76 against the same. The cap is detachably affixed to the piston head by means of countersunk screws 82.

It will be seen by this construction that no groove need be formed in the wall of the flange or chamber and that the O ring 76 upon becoming worn may be readily replaced by merely removing the cap and inserting a new one. Again, the surface of the forward piston face which is exposed to the inlet pressure can be adjusted or changed by variations in position of such an O ring so that the amount of overbalance of the valve—that is, the difference between the exposed portions of the front and rear faces of the piston—can be adjusted as desired by employing such piston head having the O ring variously located.

Figure 5:
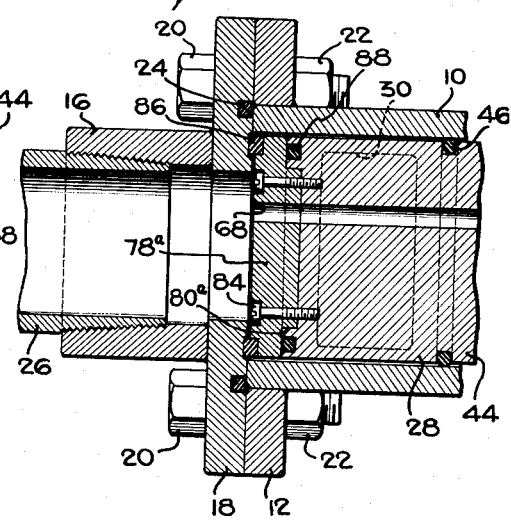
Figure 5 is a view similar to Figure 3 embracing still another modification of the piston head.

In the embodiment illustrated in Figure 5, a similar cap 78-A is centered in an annular recess of the piston head by means of circumferentially reduced neck portion 80-A inserted in a corresponding recess of the forward face of the piston and secured in place by screws 84. In this instance the enlarged portion of the cap 78-A is of corresponding diameter to the piston body and supports a generally rectangular O ring 86 at its outer edge. An additional O ring 88 is located in a groove of the piston, spaced radially outward from the shoulder recess, the ring abutting against the rear face of the enlarged portion of the cap so as to prevent the passage of fluid along the common intersection between the cap and piston head.

Figure 6:
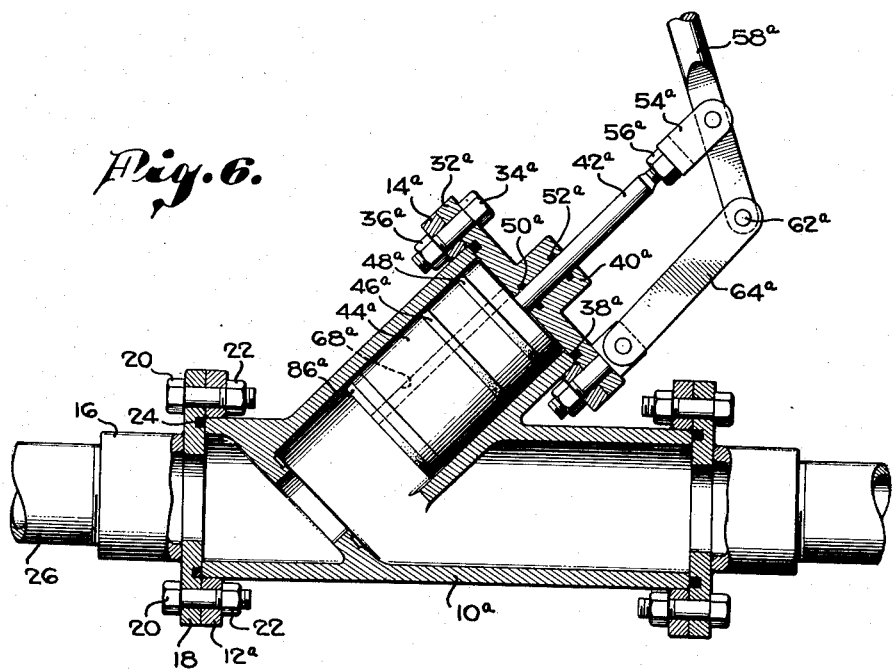
Figure 6 is a medial longitudinal sectional view, partly in elevation, of another form of my valve assembly.

In Figure 6, the piston valve is shown angularly located and extending outward from the fluid line so that fluid passing through the valve may continue linearly through the housing section 10-A. The operation of the valve is the same as in the preceding embodiments, the present structure providing in some instances a more convenient and accessible mounting lever 58-A.

While I have shown and described in some detail a presently preferred embodiment of my valve it is to be understood that various modifications may be made in the construction and operation thereof within the spirit and scope of the subsequently claimed invention.

I claim:

1. A valve for controlling the flow of fluid and adapted selectively to be maintained in either closed or open position by fluid pressure, said valve comprising a housing having therein a chamber having front and rear ends, said chamber being provided with an outlet aperture, a piston having front and rear faces reciprocably mounted in said chamber, said rear face of said piston having a substantially lesser area than the area of the front face of said piston, an orifice in said front end of said chamber, said front face of said piston and said front end of said chamber having annular mating seating surfaces thereon, the area surrounded by said annular seating surfaces being substantially less than the area of the rear face of said piston, a source of fluid pressure, a fluid passage between said source of fluid pressure and said orifice, a fluid passage between said source of fluid pressure and said chamber which enters said chamber at a point between said rear face of said piston and said rear end of said chamber, means slideable in said housing and connected to said piston to transmit a temporary actuating force thereto to shift the piston, whereby when the actuating force is released with the piston in closed position the piston is retained in such position by the fluid pressure on the rear face of the piston, such fluid pressure being partially but not entirely counteracted by the fluid pressure on the portion of the front face of the piston which is surrounded by the mating seating surfaces, and when the actuating force is released with the piston in open position the piston is maintained in the latter position by fluid pressure on the entire front face of the piston, such latter fluid pressure being partially but not entirely counteracted by the fluid pressure on the rear face of the piston.

2. A valve for controlling the flow of fluid and adapted selectively to be maintained in either closed or open position by fluid pressure, said valve comprising a housing having therein a chamber having front and rear ends, an outlet aperture formed in a side wall of said chamber adjacent said front end of said chamber, a piston having front and rear faces reciprocably mounted in said chamber, said rear face of said piston having a substantially lesser area than the area of the front face of said piston, an orifice in said front end of said chamber, said front face of said piston and said front end of said chamber having annular mating seating surfaces thereon, the area surrounded by said annular seating surfaces being substantially less than the area of the rear face of said piston, a source of fluid pressure, a fluid passage between said source of fluid pressure and said orifice, a fluid passage between said source of fluid pressure and said chamber which enters said chamber at a point between said rear face of said piston and said rear end of said chamber, means slideable in said housing and connected to said piston to transmit a temporary actuating force thereto to shift the piston, whereby when the actuating force is released with the piston in closed position the piston is retained in such position by the fluid pressure on the rear face of the piston, such fluid pressure being partially but not entirely counteracted by the fluid pressure on the portion of the front face of the piston which is surrounded by the mating setaing surfaces, and when the actuating force is released with the piston in open position the piston is maintained in the latter position by fluid pressure on the entire front face of the piston, such latter fluid pressure being partially but not entirely counteracted by the fluid pressure on the rear face of the piston.

3. A valve for controlling the flow of fluid and adapted selectively to be maintained in either closed or open position by fluid pressure, said valve comprising a housing having therein a chamber having front and rear ends, said chamber being provided with an outlet aperture, a piston having front and rear faces reciprocably mounted in said chamber, said rear face of said piston having a substantially lesser area than the area of the front face of said piston, an orifice in said front end of said chamber, said front face of said piston and said front end of said chamber having annular mating seating surfaces thereon, the area surrounded by said annular seating surfaces being substantially less than the area of the rear face of said piston, a source of fluid pressure, a fluid passage between said source of fluid pressure and said orifice, a fluid passage extending through said piston and having its openings on said front and rear faces of said piston, means slideable in said housing and connected to said piston to transmit a temporary actuating force thereto to shift the piston, whereby when the actuating force is released with the piston in closed position the piston is retained in such position by the fluid pressure on the rear face of the piston, such fluid pressure being partially but not entirely counteracted by the fluid pressure on the portion of the front face of the piston which is surrounded by the mating seating surfaces, and when the actuating force is released with the piston in open position the piston is maintained in the latter position by fluid pressure on the entire front face of the piston, such latter fluid pressure being partially but not entirely counteracted by the fluid pressure on the rear face of the piston.

4. A valve for controlling the flow of fluid and adapted selectively to be maintained in either closed or open position by fluid pressure, said valve comprising a housing having therein a chamber having front and rear ends, said chamber being provided with an outlet aperture, a piston having front and rear faces reciprocably mounted in said chamber, said rear face of said piston having a substantially lesser area than the area of the front face of said piston, an orifice in said front end of said chamber, said front face of said piston and said front end of said chamber having annular mating seating surfaces thereon, the area surrounded by said annular seating surfaces being substantially less than the area of the rear face of said piston, a source of fluid pressure, a fluid passage between said source of fluid pressure and said orifice, a fluid passage between said source of fluid pressure and said chamber which enters said chamber at a point between said rear face of said piston and said rear end of said chamber, a piston rod slideably mounted in a sealed aperture in said housing at said rear end of said chamber and integrally connected to the rear end of said piston to transmit a temporary actuating force thereto to shift the piston, whereby when the actuating force is released with the piston in closed position the piston is retained in such position by the fluid pressure on the rear face of the piston, such fluid pressure being partially but not entirely counteracted by the fluid pressure on the portion of the front face of the piston which is surrounded by the mating seating surfaces, and when the actuating force is released with the piston in open position the piston is maintained in the latter position by fluid pressure on the entire front face of the piston, such latter fluid pressure being partially but not entirely counteracted by the fluid pressure on the rear face of the piston.

DAVID R. CORMANY.

References Cited in the file of this patent

UNITED STATES PATENTS

| Number | Name | Date |
|---|---|---|
| 265,178 | Swank | Sept. 26, 1882 |
| 764,661 | Eberhardt | July 12, 1904 |
| 802,330 | Schulze | Oct. 17, 1905 |
| 1,100,320 | Moore | June 16, 1914 |
| 1,772,406 | Whiton | Aug. 5, 1930 |
| 2,032,302 | Novotny | Feb. 25, 1936 |

FOREIGN PATENTS

| Number | Country | Date |
|---|---|---|
| 9,327 | Great Britain | of 1909 |